US006713422B1

(12) United States Patent
Menger et al.

(10) Patent No.: US 6,713,422 B1
(45) Date of Patent: Mar. 30, 2004

(54) METHOD FOR PROCESSING PTHF POLYMERIZATION CATALYSTS

(75) Inventors: Volkmar Menger, Neustadt (DE); Karsten Eller, Ludwigshafen (DE); Anton Meier, Birkenheide (DE); Michael Hesse, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/889,403

(22) PCT Filed: Jan. 20, 2000

(86) PCT No.: PCT/EP00/00432

§ 371 (c)(1),
(2), (4) Date: Jul. 17, 2001

(87) PCT Pub. No.: WO00/43124

PCT Pub. Date: Jul. 27, 2000

(30) Foreign Application Priority Data

Jan. 20, 1999 (DE) .......................... 199 02 093

(51) Int. Cl.$^7$ .................................. B01J 38/06
(52) U.S. Cl. ........................................... 502/55
(58) Field of Search ............................. 502/55

(56) References Cited

U.S. PATENT DOCUMENTS

| 5,202,295 A | | 4/1993 | McCauley | .................... 502/65 |
| 5,268,345 A | | 12/1993 | Mueller | ....................... 502/56 |
| 5,773,648 A | * | 6/1998 | Becker et al. | ............... 560/240 |
| 6,111,147 A | * | 8/2000 | Sigwart et al. | ............. 568/617 |
| 6,211,401 B1 | * | 4/2001 | Eller et al. | ................... 560/240 |

FOREIGN PATENT DOCUMENTS

| JP | 54 33503 | | 3/1979 | |
| WO | WO 98/15589 | * | 4/1998 | ........... C08G/65/10 |
| WO | WO 98/24829 | * | 6/1998 | ........... C08G/65/20 |

* cited by examiner

*Primary Examiner*—Stanley S. Silverman
*Assistant Examiner*—Jonas N. Strickland
(74) *Attorney, Agent, or Firm*—Keil & Weinkauf

(57) ABSTRACT

A process for working up at least partially deactivated polymerization catalysts for the polymerization or copolymerization of THF which are contaminated with the products of the polymerization or copolymerization of THF comprises (a) in a first step, cleaning the polymerization catalyst by treatment with steam at from 80 to 250° C. and a pressure of from 0.5 to 40 bar and, preferably, (b) in a second step, regenerating the clean polymerization catalyst.

9 Claims, No Drawings

METHOD FOR PROCESSING PTHF POLYMERIZATION CATALYSTS

The present invention relates to a process for working up at least partially deactivated polymerization catalysts and to the use of the worked-up polymerization catalysts.

It is known that sheet silicates such as smectites, kaolin and attapulgite can be used as polymerization catalysts for the polymerization of tetrahydrofuran (THF) to polytetrahydrofuran (pTHF). This polymerization can be carried out in the presence of telogens. For example, montmorillonite, which belongs to the smectite class, is used for the polymerization of THF in the presence of acetic anhydride as telogen to form pTHF diacetate. Copolymerization of THF with ethylene oxide or propylene oxide, for example using kaolin or attapulgite as catalysts, gives polybutylene-alkylene glycol ethers.

As the time for which they have been used as polymerization catalysts increases, the sheet silicates lose catalytic activity and finally have to be replaced. However, the replacement of exhausted, deactivated catalysts is associated with a complicated cleaning procedure in which the exhausted catalyst is freed of adhering products of the polymerization reaction. The cleaning process is necessary, inter alia, to restore the flow properties of the catalyst bed so that the catalyst can be removed from the polymerization reactor without problems by suction. The customary procedure is to wash the exhausted catalyst contaminated by highly viscous pTHF diacetate with water and methanol, for example as described in U.S. Pat. No. 5,268,345. To free the catalyst of adhering extractant, the catalyst bed has to be rinsed a number of times with water before it is removed by suction. This results in large amounts of washing water which are contaminated by the extractant. The cleaning procedure described is time-consuming and costly. The large amounts of solvent-containing washing water have to be treated. The catalyst removed from the reactor is, even after this cleaning procedure, generally still so contaminated with solvent that it does not meet the pollutant thresholds prescribed in Germany for disposal of the catalyst in a landfill and therefore has to be incinerated.

It is an object of the present invention to provide a process for working up exhausted polymerization catalysts for the polymerization of THF which allows quick and inexpensive replacement of catalyst and which gives a worked up catalyst which is largely free of pollutants and can be disposed of in a landfill.

We have found that this object is achieved by a process for working up at least partially deactivated polymerization catalysts for the polymerization or copolymerization of THF which are contaminated with the products of the polymerization or copolymerization of THF, which process comprises cleaning the polymerization catalyst by treatment with steam at generally from 80 to 250° C., preferably from 100 to 200° C., and an absolute pressure of generally from 0.5 to 40 bar, preferably from 1 to 16 bar. The clean polymerization catalyst can, in a second step, be disposed of in a landfill, regenerated, used in another way or incinerated. The clean polymerization catalyst can also be used, for example, for the depolymerization of pTHF which is not within specification.

The clean polymerization catalyst is preferably regenerated. Preference is therefore given to a process for working up polymerization catalysts in at least two steps, which comprises (a) in a first step, cleaning the polymerization catalyst in the manner described above, and (b) regenerating the clean polymerization catalyst.

The process of the present invention is used for working up at least partially deactivated polymerization catalysts for the polymerization or copolymerization of THF. The polymerization catalyst is partially deactivated when it has lost its original catalytic activity or when the color number of the polymer exceeds the specification limit. A partially deactivated polymerization catalyst can, for example, still have a residual activity of 80% of the original activity. It is possible to work up polymerization catalysts which have been used for the polymerization of THF to pTHF or for the copolymerization of THF with alkylene oxides, for example ethylene oxide or propylene oxide, to give the corresponding polybutylene-alkylene glycol ethers, where both the polymerization and the copolymerization may have been carried out in the presence of telogens. Telogens are, for example, water, monohydric and polyhydric alcohols such as methanol, ethanol, propanol, ethylene glycol, butylene glycol, glycerol, neopentyl glycol, 1,4-butanediol, also aliphatic carboxylic acids having from 1 to 8 carbon atoms, e.g. formic acid, acetic acid, propionic acid, butyric acid, and aromatic carboxylic acids such as benzoic acid, and also their anhydrides.

The at least partially deactivated polymerization catalysts are contaminated with the products of the polymerization or copolymerization. Products of the polymerization or copolymerization are pTHF, polybutylene-alkylene glycol ethers or their reaction products with the abovementioned telogens.

The process of the present invention is preferably used for working up polymerization catalysts based on silicates. Polymerization catalysts based on silicates are naturally occurring or synthetic sheet silicates, for example naturally occurring smectites, in particular sodium montmorillonite or calcium montmorillonite, also kaolin, attapulgite and sepiolite. Other polymerization catalysts based on silicates are zeolites. The silicates or sheet silicates mentioned are usually activated by treatment with acids and are subsequently calcined. The acid treatment generates acid centers in the clay minerals by ion exchange and/or increases the surface area of the catalyst. Some minerals such as attapulgite and sepiolite have sufficient acid centers even without acid treatment. Acid centers can also be obtained by calcining ammonium compounds of the minerals concerned.

In a preferred embodiment of the process of the present invention, polymerization catalysts based on sheet silicates, in particular acid-activated montmorillonite, which are used for the polymerization or copolymerization of THF are worked up. In particular, polymerization catalysts of this type for the polymerization of THF in the presence of acetic anhydride as telogen to give pTHF diacetate are worked up. The latter are mainly contaminated with pTHF diacetate.

In a first step of the process of the present invention, the polymerization catalyst is treated with steam at from 80 to 250° C., preferably from 100 to 200° C., and an absolute pressure of from 0.5 to 40 bar, preferably from 1 to 16 bar. For this purpose, the exhausted polymerization catalyst can be left in the polymerization reactor and, if appropriate after blowing-off the reaction mixture, steam is introduced into the polymerization reactor. At the specified temperature and the specified pressure, hydrolytic cleavage of the polymer molecules into low molecular weight units occurs and these can readily be leached from the polymerization catalyst and transported away by means of the steam. In the case of polymerization catalysts contaminated with pTHF diacetate, for example, hydrolysis with elimination of acetic acid and subsequent depolymerization of pTHF into THF and THF oligomers occur. The hydrolytic cleavage and depolymerization of the highly. viscous pTHF restores the flow properties of the polymerization catalyst, so that this can be removed from the polymerization reactor without problems. Any catalyst beds in any reaction apparatuses can be worked up in this way. For example, the catalyst can be in the form of granules, extrudates, spheres or other shaped bodies. The clean catalyst can, for example, be removed by sucking it from the polymerization reactor or by blowing it out downward.

The steam treatment cleans the polymerization catalysts to the extent where the organic constituents, measured as loss on ignition of the dry residue, are less than 10% by weight and the TOC content (total organic carbon) in the eluate of the steam-treated catalyst is <200 mg/l. Organic constituents are the polymerization product and its oligomeric or monomeric degradation products, for example pTHF diacetate, pTHF, oligomeric butylene ethers, THF and 1,4-butanediol. In step (a), a treatment time of, for example, from 24 hours to 96 hours can be sufficient to reduce the content of organic constituents in the polymerization catalysts to a loss on ignition of <10% by weight and a TOC in the eluate of <200 mg/l. The treatment time is preferably from 30 hours to 70 hours, with the treatment time being dependent on the size of the reactor and accordingly also being able to be much larger or much smaller.

In one embodiment of the process of the present invention, the clean polymerization catalyst is subsequently disposed of in a landfill. The low content of organic constituents, in particular, soluble organic constituents such as THF, in the polymerization catalysts makes it possible for them to be disposed of in a landfill instead of having to be incinerated. Clean polymerization catalysts which are disposed of in a landfill preferably have a content of organic constituents corresponding to a loss on ignition of the dry residue of <10% by weight and a TOC in the eluate of <200 mg/l.

The clean polymerization catalyst can also be used for the depolymerization of pTHF. The latter is preferably pTHF which is not within specification and has a molar mass different from that desired.

However, the clean polymerization catalyst is preferably regenerated in a second step (b).

The clean polymerization catalyst is regenerated by calcination in an oxygen-containing atmosphere at >200° C. Clean polymerization catalysts to be regenerated preferably have a content of organic constituents corresponding to a loss on ignition of the dry residue of <5% by weight. The calcination is preferably carried out at from 400 to 800° C., particularly preferably from 450 to 600° C. Calcination temperatures below 200° C. are generally not sufficient to remove the organic constituents still present after steam treatment (step (a)).

Calcination temperatures above 800° C. generally change the catalyst properties so that it no longer has the original activity after regeneration. The calcination time depends both on the amount of organic constituents still present in the catalyst and on the calcination temperature. In general, a calcination time of from 0.5 to 24 hours will be sufficient. The calcination time is preferably from 0.5 to 10 hours, particularly preferably from 0.7 to 5 hours.

The catalyst is calcined in an oxygen-containing atmosphere. The calcination can, for example, be carried out in air. However, it is also possible for the calcination to be commenced in an inert gas atmosphere comprising, for example, nitrogen and increasing amounts of oxygen or air to be mixed into this. In this way, excessively vigorous combustion of the oxidizable organic constituents during the calcination and associated local overheating of the catalyst can be avoided. The introduction of oxygen or inert gas can advantageously be controlled via a temperature measurement.

The calcination of the polymerization catalysts can be carried out in customary calcination apparatuses. Examples are rack furnaces, shaft furnaces, rotary tube furnaces and tunnel calciners. The calcination is preferably carried out in rotary tube furnaces or tunnel calciners. It is also possible to carry out an in-situ calcination in the polymerization reactor itself. In this way, the removal and reinstallation of the catalyst for the purposes of regeneration can be avoided. The clean catalyst is preferably brought to the calcination temperature by means of preheated nitrogen and is regenerated by metering in oxygen or air.

The calcination restores the activity of the polymerization catalyst to the extent that it can be reused for the polymerization or copolymerization of THF, preferably in the presence of telogens. For this purpose, the regenerated polymerization catalyst is, if necessary, reinstalled in the polymerization reactor and polymerization is carried out, if desired in the presence of telogens such as acetic anhydride.

The invention is illustrated by the following example:

EXAMPLE

In a polymerization reactor for the polymerization of THF in the presence of acetic anhydride to give pTHF diacetate, comprising a reaction tube having an internal diameter of 15 cm, the catalyst bed of activated alumina in the form of 2.5 mm thick extrudates was worked up as follows after an operating period of 9 months. By means of a steam line, steam at 5 bar absolute and 150° C. was introduced from above into the catalyst bed. The mass flow was about 0.5 kg/h. After 69 hours, a very free-flowing catalyst bed was obtained and this could be removed without problems by suction. The loss on ignition of the clean catalyst was in the range from 3 to 6% by weight; TOC contents in the eluate in the range from 5 to 30 mg/l were measured.

The process of the present invention enabled the time required for changing the catalyst to be halved. Furthermore, it gave a clean catalyst whose content of organic constituents allowed disposal in a landfill.

We claim:

1. A process for working up an at least partially deactivated polymerization catalyst previously employed in the polymerization or copolymerization of THF and being contaminated with products of the polymerization or copolymerization of THF, which process comprises providing the at least partially deactivated catalyst, and cleaning the at least partially deactivated catalyst by treating it with steam at from 80 to 250° C. and an absolute pressure of from 0.5 to 40 bar to obtain a cleaned catalyst.

2. The process of claim 1, which further comprises a step wherein the cleaned catalyst is regenerated.

3. The process of claim 2, wherein the cleaning stage reduces the content of organic constituents in the at least partially deactivated catalyst to a value corresponding to a loss on ignition of the dry residue of <10% by weight and a TOC in the eluate of <200 mg/l.

4. The process of claim 2, wherein the cleaned catalyst is regenerated by calcination in an oxygen-containing atmosphere at >200° C.

5. The process of claim 4, wherein the calcination is conducted at from 400 to 800° C. for from 0.5 to 24 hours.

6. The process of claim 1, wherein the at least partially deactivated catalyst is a catalyst based on sheet silicates.

7. The process of claim 1, wherein the at least partially deactivated catalyst is a catalyst based on acid-activated montmorillonite.

8. The process of claim 1, wherein the at least partially deactivated catalyst is obtained from a polymerization or copolymerization of THF in the presence of telogens.

9. The process of claim 1, wherein the at least partially deactivated catalyst is obtained from a polymerization of THF in the presence of acetic anhydride as telogen to give pTHF diacetate.

* * * * *